United States Patent [19]
Coombs et al.

[11] Patent Number: 5,840,245
[45] Date of Patent: Nov. 24, 1998

[54] AIR FILTER AMD METHOD FOR REDUCING THE AMOUNT OF MICROORGANISMS IN CONTAMINATED AIR

[75] Inventors: Garth Coombs, Evergreen; Isidro Vasquez Bastidas, Jr., Littleton, both of Colo.

[73] Assignee: Johns Manville International, Inc., Denver, Colo.

[21] Appl. No.: 567,609

[22] Filed: Dec. 5, 1995

Related U.S. Application Data

[63] Continuation of Ser. No. 869,560, Apr. 15, 1992, abandoned.
[51] Int. Cl.$^6$ ........................................................... A61L 9/00
[52] U.S. Cl. .................................. 422/4; 55/279; 55/524; 422/28; 422/122
[58] Field of Search ................... 422/4, 28, 122, 422/255; 55/279, 524, 527–528, 486–487

[56] References Cited

U.S. PATENT DOCUMENTS

| | | |
|---|---|---|
| 2,561,379 | 7/1951 | Kalberg . |
| 2,608,556 | 8/1952 | Kalberg . |
| 2,769,006 | 10/1956 | Kalberg . |
| 3,686,331 | 8/1972 | O'Brien et al. . |
| 3,877,965 | 4/1975 | Broadbent et al. . |
| 3,918,981 | 11/1975 | Long ................................... 106/15 AF |
| 4,324,574 | 4/1982 | Fagan ........................................ 55/487 |
| 4,430,381 | 2/1984 | Harvey et al. ......................... 428/284 |
| 4,504,387 | 3/1985 | LeMire et al. .......................... 210/101 |
| 4,533,435 | 8/1985 | Intili ........................................ 162/161 |
| 4,563,485 | 1/1986 | Fox, Jr. et al. ......................... 523/113 |
| 4,612,026 | 9/1986 | Pollara et al. ............................ 55/274 |
| 4,612,337 | 9/1986 | Fox, Jr. et al. ......................... 523/113 |
| 4,728,323 | 3/1988 | Matson ................................... 604/304 |
| 4,746,504 | 5/1988 | Nimrod et al. .......................... 424/1.1 |
| 4,766,113 | 8/1988 | West et al. .............................. 514/187 |
| 4,769,268 | 9/1988 | Burton . |
| 4,842,932 | 6/1989 | Burton . |
| 4,876,070 | 10/1989 | Tsukahara et al. ..................... 422/122 |
| 4,877,433 | 10/1989 | Oshitari .................................... 55/486 |
| 4,906,466 | 3/1990 | Edwards et al. .......................... 424/78 |
| 4,961,916 | 10/1990 | Lesage et al. ............................ 422/88 |
| 5,009,898 | 4/1991 | Sakuma et al. ......................... 424/618 |
| 5,024,851 | 6/1991 | Goad et al. ................................. 427/2 |
| 5,066,328 | 11/1991 | Zlotnik ................................. 106/18.32 |
| 5,147,686 | 9/1992 | Ichimura et al. ........................ 427/217 |
| 5,296,238 | 3/1994 | Sugiura et al. .......................... 424/604 |

FOREIGN PATENT DOCUMENTS

| | | |
|---|---|---|
| 52-44458 | 7/1977 | Japan . |
| 58-8530 | 1/1983 | Japan . |
| 60-64611 | 4/1985 | Japan . |
| 177821 | 5/1989 | Japan . |
| 433914 | 3/1992 | Japan . |
| 579571 | 8/1946 | United Kingdom . |
| 1564413 | 4/1980 | United Kingdom . |
| 9104464 | 12/1991 | WIPO . |

OTHER PUBLICATIONS

H. K. Pulker, Coatings On Glass, Thin Films Science and Technology, vol. 6, Elsevier Publishing Co., Inc., 1984.
R. Williams et al, The Biocompatibility of Silver, vol. 5, Issue 3, (1989), pp. 221–241.
Manville Fiber Glass Filtration Media Brochure, Aug. 1989.
V. Bencko et al., Indoor Air Microbial Pollution Control Measures in Health Facilities, pp. 207–212.
Hygene Bacteriostatic Water Filter Media, Hygene Technical Bulletin, Ionics, Incorporated; Bridgeville, PA.
J. D. Collins, A Brief History Of Silver In Water Treatment, Ionics, Incorporated, Bridgeville, PA.
Advertisement for Silver Impregnated Activated Carbon, Ionics, Incorporated, Bridgeville, PA.

*Primary Examiner*—Robert J. Warden
*Assistant Examiner*—Krisanne M. Thornton
*Attorney, Agent, or Firm*—Robert D. Touslee

[57] ABSTRACT

Described is a method for reducing the amount of microorganisms in contaminated air in which a fiberglass containing air filtration media is provided which contains an antimicrobially effective amount of an inorganic antimicrobial agent; and forcing the contaminated air through the air filter thereby reducing the amount of microorganisms in the contaminated air. The invention further pertains to media for reducing the amount of microorganisms present in contaminated air as well as methods of applying the inorganic antimicrobial agents to the media and for the media to be present in a rigid air filter.

12 Claims, 4 Drawing Sheets

AIR FILTER AMD METHOD FOR REDUCING THE AMOUNT OF MICROORGANISMS IN CONTAMINATED AIR

This is a continuation of application of application Ser. No. 07/869,560, filed Apr. 15, 1992, now abandoned entitled AIR FILTER AND METHOD FOR REDUCING THE AMOUNT OF MICROORGANISM IN CONTAMINATED AIR.

TECHNICAL FIELD

This invention relates to air filtration media which contain an antimicrobial agent therein which substantially reduces the amount of microorganisms present in contaminated air when the contaminated air is passed through an air filter, made with said air filtration media, as well as methods of using and making such an air filter.

BACKGROUND OF THE INVENTION

Airborne infectious agents are the primary cause of many diseases of the respiratory tract. These diseases are common and well known. It is characteristic of respiratory diseases that they tend to occur in epidemic proportion, appearing explosively and attacking large numbers of people within a short time. The incidence of these respiratory diseases increases during the fall and winter. Unknown agents cause most respiratory infections, but others may be due to interaction of two or more microorganisms. Acute respiratory illness, including the common cold, accounts for the loss of close to 100 million workdays a year in the United States, including more than 50% of school absences.

With the proliferation of large office buildings, there has been an increasing awareness of the "sick building" syndrome. A "sick building" refers to a building where a higher than normal percentage of the people who are working and/or living therein experience disease and/or sickness. One potential causative agent is the accumulation and growth of microorganisms on air filters and subsequent migration into the downstream air system. Although pathogenic contaminants normally exist in the air, their numbers can dramatically increase in the presence of favorable environmental conditions. Their activity is influenced by many variables, including humidity and air temperature, food materials such as dirty air ducts and dirt on filter media, and the amount of air flow in the air handling system.

The pathogenic contaminants normally present in air can vary from location to location. Normal microbial contaminants may consist of bacteria, yeast, molds, algae, or multiple combinations thereof. Since these contaminants travel via the dust particles, water droplets, and free floating entities carried in the air of ventilation systems, trapping and eliminating them is desirable for maintaining a clean air environment, particularly in buildings where the air is significantly recycled.

There is, therefore, a need for air ventilation system manufacturers to address the problem of the "sick building." What is needed is a device and/or method that is capable of ameliorating the "sick building" syndrome.

Inorganic antimicrobial agents have been known. Silver nitrate is used in the treatment of infants and for athlete's foot. Silver is used extensively for the purification of water. Copper containing paints are used on the underside of boats to prevent fungal growth.

U.S. Pat. No. 4,728,323 issued to Matson, Mar. 1, 1988 discloses antimicrobial wound dressings comprised of a conformable substrate vapor coated or sputter coated with an antimicrobially effective film of a silver salt. Preferred silver salts are silver chloride and silver sulfate. In order for the dressing to be effective, it is necessary that the substrate conform to the limb or body surface in order to facilitate the close physical interaction necessary between the wound and the silver salts.

U.S. Pat. No. 4,876,070 issued to Tsukahara et al, Oct. 24, 1989 discloses an air blower apparatus wherein each component part is molded of a polypropylene resin to which an antimicrobial agent has been added. The antimicrobial agents are selected from diphenylether, N-haloalkylthio compounds, benzimidazoles, organic arsine compounds and metal alumino-silicate hydrate. Because each component of the air conditioner or heater must have the antimicrobial agent therein, this is an expensive and difficult way of cleaning an air space. Likewise, it is extremely difficult and expensive for the user to replace depleted parts.

What is lacking in the prior art disclosures is a safe, effective, economical, and easy to use way of substantially reducing the amount of dangerous pathogenic contaminants in an air stream that will not further contaminate downstream air with the antimicrobial agent under normal operating conditions.

Biocidal air filters could employ organic antimicrobial agents. Although they are used in a wide variety of other applications, organic antimicrobial agents would be subject to volatilization, codistillation, and/or leaching into downstream air. Since volatilization and codistillation are a function of temperature and humidity, organic antimicrobial agents present in air filters may be particularly subject to stripping.

It is an objective of the present invention to provide an antimicrobial agent for air filtration media and rigid filters which will not volatilize nor codistill as a result of normal operating conditions to further contaminate the air stream passing therein.

Another objective of the present invention is to provide biocidal air filtration media which will reduce the amount of microorganisms present in contaminated air without further contaminating that air with volatilized antimicrobial agent.

Finally, another objective of the invention is to provide methods of applying inorganic biocide(s) on air filtration media which will reduce the amount of microorganisms present in contaminated air without further contaminating the downstream air with volatilized antimicrobial agent.

The present invention accomplishes these objectives and more.

SUMMARY OF THE INVENTION

The present invention relates to a method for substantially reducing the amount of microorganisms present in contaminated air by providing a fiberglass containing air filtration media containing an antimicrobially effective amount of an inorganic antimicrobial agent; and forcing the contaminated air through the air filtration media thereby reducing the amount of microorganisms in the contaminated air. The invention further pertains to performing the application of said biocides to air filtration media for accomplishing the claimed method.

DESCRIPTION OF PREFERRED EMBODIMENTS

The present invention broadly provides for a method of easily and economically removing harmful microorganisms from contaminated air that will not further contaminate said air under normal operating conditions. In addition, the present invention provides several embodiments of a fiberglass media and filter found to be particularly suitable which can be employed in the described method to accomplish the objective of improved air quality. Finally, the present invention also provides methods of making the described biocidally charged air filter.

As used herein, contaminated air is intended to describe any unit of air having a substantial concentration of microorganisms therein. It is intended to describe the air currently present in buildings utilizing traditional mechanical air filters. Microorganism as used herein is intended to describe any organism of microscopic or ultra microscopic size. It is intended to include organisms such as bacteria, yeast, molds, viruses, and combinations containing such, normally encountered in the air space of residential, commercial and industrial buildings.

It is believed that the inorganic antimicrobial agents utilized in the present invention have both biocidal and bacteriostatic functional mechanisms. That is, the inorganic antimicrobial agents used herein are believed to both destroy the microorganisms and also cause the inhibition of reproduction. The term antimicrobial is thus intended to encompass the terms biocidal and bacteriostatic.

Because the antimicrobial agents of the present invention are inorganic, they are not subject to volatilization, codistillation, nor leaching as a function of environmental percolating water, humidity, temperature, and pressure.

Figure 1:
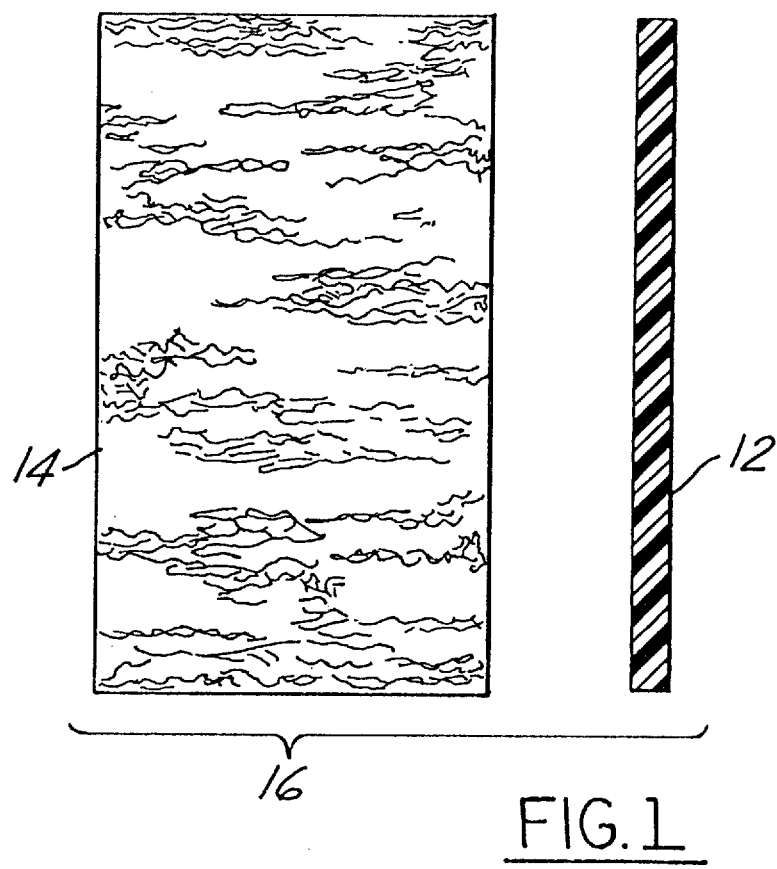
FIG. 1 illustrates an exploded perspective of a side view of a preferred embodiment of the present invention.
Figure 2:
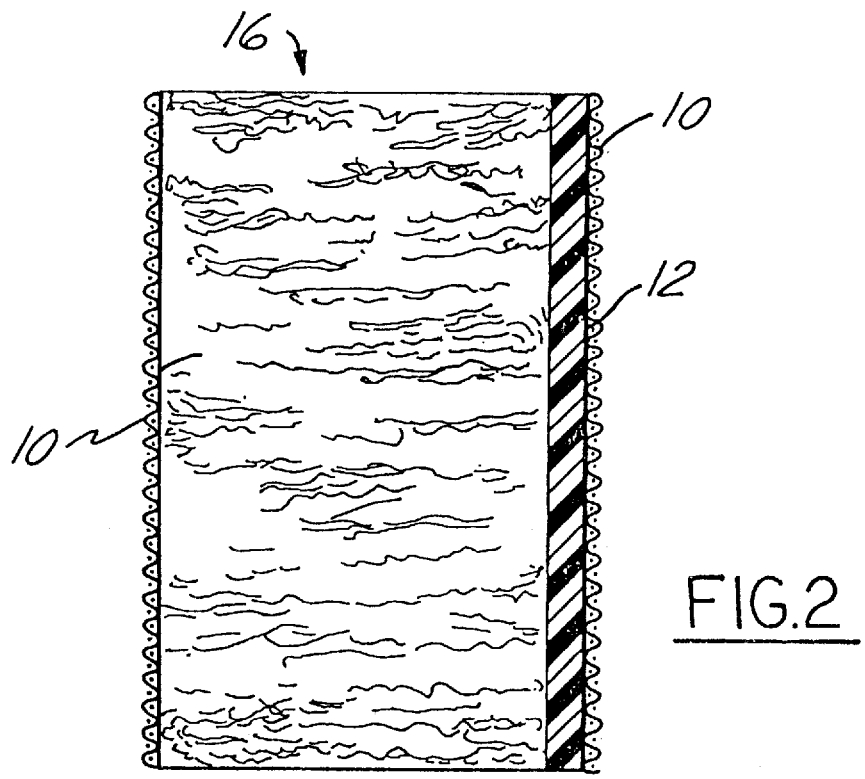
FIG. 2 illustrates a side view of a preferred embodiment of air filtration media used in the invention.

FIG. 1 shows an exploded perspective of a side view of a preferred embodiment of the apparatus of the invention. FIG. 2 illustrates a side view of a preferred embodiment of the apparatus. In FIGS. 1 and 2 the air filtration media 14 contains a fiberglass mat to which is applied an inorganic antimicrobial agent as described herein. The fiberglass may be present alone or in combination with a polymeric binder.

The fiberglass of the air filtration media 14 is of rod-like form generally known in the industry as bulk or blown fiberglass for insulation and allied applications. Such glass fibers are generally described in FIBER GLASS J. Gilbert Mohr, William P. Rowe, Van Nostrand Rinehold Company 1987, New York which is hereby incorporated by reference, with particular attention directed to pages 136–152.

Preferably, the fiberglass used in the air filtration media 14 is made from a fiber insulation type chemistry which is know and described by those in the art as alkali, lime-alumino, borosilicate glass. The air filtration media is made by co-mingling fiberized glass and an aerosol of water soluble, partially reacted, modified phenol formaldehyde resin binder. The co-mingling of glass and binder aerosol is done in an air stream, and the mixture is collected on a moving filter screen, usually with a support scrim on the filter screen. The fibers and impinged binder aerosol form a mat, usually ⅛ to ½ inch thickness. During the co-mingling and collection, the binder aerosol is undergoing evaporation of some of the binder water. Once collected on the screen (or scrim), the air filtration mat is conveyed through a series of curing ovens designed to complete the evaporation of binder water, and to complete the condensation reaction of the phenol formaldehyde resin. The cured air filtration media is rolled up, inserted in a protective polyethylene bag, and labelled with the product designation. The finished media is sold to filter manufacturers who cut and sew the media into deep bags or pleated modules that are mounted in holding frames for insertion in the building air system.

A fiberglass media found to be particularly suitable is manufactured by the Manville Corporation. This media is commonly composed of borosilicate glass fiber with a phenol/urea formaldehyde resin binder. Various grades of media are produced which are supplied to various fabricators who produce finished filtration devices of various designs. The media supplied by Manville is in the form of roll goods. The fiberglass may be produced from a wide range of nominal fiber diameters, from, but not limited to, 0.60 to 5.0 microns. The nominal thickness and weight per square foot (density) of the media also varies, but is not limited to, 0.10 to 0.50 inches thick and 4.0 to 12.0 gm. per sq. ft. These media are used to fabricate finished filter devices that are commonly used in HVAC (Heating, Ventilating, & Air Conditioning) applications. These finished filters can be produced to meet ASHRAE (American Society of Heating, Refrigeration, Air Conditioning Engineers) Atmospheric Efficiency ratings from, but not limited to, 20 to 95%; and/or ASHRAE Arrestance ratings from, but not limited to, 50 to 99%. These fiberglass media can be produced with or without various woven or nonwoven scrim backing materials. See 1988 ASHRAE Handbook, Equipment, Chapter 10.

The inorganic antimicrobial agents used in the present invention are the inorganic salts of certain transition metals. Preferably, inorganic salts of silver, cooper, gold, and zinc will be used. Most preferably, compounds such as silver nitrate and copper II nitrate will be employed. Such salts may be used alone or in combination thereof. It will be appreciated that other salts such as silver chloride, copper sulfate, and copper acetate may be employed. Generally, the compounds of this invention will contain a metal which is in its most stable oxidation state. The most preferred examples of this are copper in the +2 oxidation state and silver in the +1 state. The soluble silver nitrate is readily converted to the insoluble chloride or oxide by reaction with the binder solution.

An antimicrobially effective amount of these inorganic antimicrobial agents will generally be from 0.01 to 2.0 grams calculated as metal per square feet of fiberglass mat. Most preferably the inorganic antimicrobial agents will be present in an amount from 0.01 to 0.02 grams per square feet of fiberglass mat.

As previously discussed, the air filtration media 14 may also consist of a polymeric binder material which substantially bonds the glass fibers. Preferably, the binder will be either a thermoplastic or thermoset polymer. Suitable commercially available binders are water soluble resins such as phenolic, melamine, acrylic thermosetting and the like.

Most preferably, the binder will be a phenolic resin. Phenolic resins are particularly suitable. After incorporation of the binder and curing, the air filtration media should meet ASHRAE's efficiency ratings, as previously discussed.

Phenolic resins found to work extremely well in the instant invention are dispersed salt phenolic resins having phenol to formaldehyde ratios of 1.50 to 4.00. Some of these resins are made by the Borden Chemical Company and by the Georgia Pacific Corporation. These include Borden's resin #5056, and Georgia Pacific's resin #2818. Other commercially available phenolic resins made are also satisfactory with the inorganic antimicrobial agents of the invention. For the most part, these phenolic resins are combined with a basic catalyst in an aqueous solution containing insoluble dispersed salts.

The above binder formulation is normally applied at approximately 8 to 12 percent by weight to the fiberglass mat.

The partially cured phenolic resin binder utilizes a cure cycle to evaporate residual water and complete the condensation reaction or cure of the resin. This is accomplished in heated conveyor ovens and/or searing rolls. If ovens are used, the binder is cured between 400° and 500° F. for 1 to 3 minutes.

FIGS. 1 and 2 also illustrate the use of a scrim. The invention contemplates that the inorganic antimicrobial agent can either be applied to the scrim or to the glass fiber per se or to the mat or to fiberglass mat and scrim, in conjunction with the binder.

As stated before, the inorganic antimicrobial agents may be applied to the scrim in an antimicrobially effective amount. This amount is intended to be the same as that on the air filtration media 14, 0.01 to 2.0 grams per square feet of scrim. Most preferably, the inorganic antimicrobial agents will be present in an amount from 0.01 to 0.02 grams per square feet of scrim.

It will thus be appreciated that the biocidally treated air filter of the invention will be comprised of fiberglass air filter media 14 in combination with scrim 12. In such an embodiment, it will be appreciated that the scrim will be placed in the back of the air filter media 14. If only the scrim is treated with the inorganic antimicrobial agents, then the contaminated air stream will contact the treated scrim after it leaves the fiberglass air filter media 14. The advantages of treating only the scrim backing with the antimicrobial agents may be economical and practical in allowing the scrim manufacturer to apply the antimicrobial agents themselves and in maintaining filter media efficiency parameters intact in certain filters (even though there was no interference observed in filter efficiencies, specially since during testing of the invention, the inventors used the highest air filtration efficiency filter manufactured by the Manville Corporation for their testing). If only the fiberglass air filter media is treated with the antimicrobial agents, then the contaminated air stream will immediately come into contact with the antimicrobial agents on the fiberglass media. The advantage of treating only the fiberglass media is that it will immediately inhibit reproduction and growth of microorganisms in the larger area of the media itself. If both the fiberglass filter media and the scrim are treated with the antimicrobial agents, then the potency effect of the biocidal and bacteriostatic functional mechanisms of the filter are elevated for destroying microorganisms and inhibiting their reproduction throughout the whole filter.

The invention contemplates that the scrims 12 be comprised of a commercially available woven or non-woven fiberglass or polymeric material. Commonly, the scrims will be made of either a polyester material or a nylon material. A suitable polyester material is manufactured by the Reemay Corporation under the tradename "REEMAY" and is comprised of non-woven, spun-bonded, continuous polyester fibers, with densities of 0.4 and 1.0 oz. per square yard. It is supplied by the SNOW Filtration Co. of Cincinnati, Ohio.

Another preferred scrim material is manufactured by FiberWeb of North America, Inc., under the tradename "CEREX." It is made of non-woven, spun-bonded, continuous nylon fibers with densities of 0.4 and 1.0 oz. per square yard. It is also supplied by the SNOW Filtration Co. of Cincinnati, Ohio.

The treated scrim and/or treated filter media is typically converted into commercial filters by cutting and sewing into suitable deep-pleated filter bags or pockets that are mounted in frames 10 for installation into the air filter system. Flat media can be used, but generally pleated or pocketed media offers greater filtration area and lower face velocities which give better filtration results.

The invention further contemplates a method of using the antimicrobially charged air filters described above. The air filters of the present invention may be stationed in any desired air passageway. Contaminated air entering the air filter will, upon leaving have a substantially reduced concentration of microorganisms.

It is anticipated that the antimicrobially charged air filters of the present invention can be utilized in residential, commercial and industrial buildings. Because they are easily installed and replaced, they are suitable for use in appliances which facilitate the movement of air such as furnaces and air conditioners, including HVAC devices. The filters are proven to perform in all ambient environments, and under all HVAC air flows, especially since, after application, they bond to the fiberglass mat and scrim becoming insoluble.

The invention contemplates several methods of applying the inorganic antimicrobial agents to air filtration media. The incorporation of the inorganic antimicrobial agent into the air filters 16 of FIGS. 1 and 2 can be accomplished in any one of several ways. Various embodiments are discussed below.

Most preferably, the inorganic antimicrobial agents will be incorporated into the polymeric binder and thence applied to the fiberglass mat. Approximately 0.05 to 20.0 weight percent of the inorganic antimicrobial agents to weight of binder may be utilized. Although Applicant does not wish to be bound to any particular theory, Applicant believes that the basic catalyst present in the binder solution previously discussed above causes the inorganic antimicrobial agents to precipitate as insoluble salts. The insoluble salts are attached to the fiberglass by the binder.

Alternatively, the inorganic antimicrobial agent can be applied as a first spray to the air filtration media 14 followed by a second spray of a reducing solution compatible to the inorganic salt used. The air filtration media's reducing solution is compatible to the inorganic salt used (i.e., a solution of AgNO3 silver salt as one reagent solution and a reducing compound of sucrose or formaldehyde dissolved in a second solution). The air filtration media's first spray is preferably phenolic binder with a solution of a silver or copper salt in the presence of aqueous calcium or sodium based salts. The second spray may consist of a chloride solution preferably chlorinated water. Also, the air filtration media 14 containing a binder is preferably cured prior to the application of the inorganic antimicrobial spray. However, it is possible for the spray to be applied to a non-cured binder/fiberglass mat combination. It is preferable for the binder to be cured prior to the application of the antimicrobial spray in order to facilitate manufacturing in a production setting.

After the inorganic antimicrobial spray is applied, a second spray of a precipitating solution is applied. A suitable second spray would be a chloride solution as described above, preferably an aqueous solution containing at least 0.1% chloride.

It is also possible for the two sprays to be combined into one solution comprised of the inorganic antimicrobial agent and a reducing agent such as sucrose. The reducing solution should contain at least 20% by weight of the inorganic antimicrobial agent.

Finally, the inorganic antimicrobial agent can be plated onto the bare glass fibers. This is also known as the chemical silvering of glass. This method of application incorporates existing technology used in the application of tinting or mirroring to glass.

A silver solution prepared with potassium and amononium hydroxide can be reduced at the glass surface with sucrose and nitric acid @ 4:1 silver solution to reducing sucrose solution. Such film deposition process is described in "Coatings On Glass", H. K. Pulker, Elsevier Science Publishing Co., Inc., 1984, pp. 94–96.

The following examples are provided to illustrate the invention, but are not intended to limit the invention. All degrees are centigrade and all parts are by weight % otherwise indicated.

EXAMPLE 1

The inorganic antimicrobial agents of the instant invention were compared with organic antimicrobial agents. Generally these were mixed with the preferred phenolic resin and/or water before application. Except where noted, antimicrobial agents were applied after they were dissolved in 100 ml of binder (phenolic resin) and 30 ml of water before being sprayed onto the media.

The antimicrobial agents were applied to 8 inch×8 inch sections of (0.44 ft$^2$) fiberglass air filtration media with a one liter hand-held squirt bottle which was set to produce an even mist. Each squirt delivered an approximate volume of 1.5 ml of solution.

The air filtration media 14 used in the experiment consisted of burned out type AFS-3 made by the Manville Corporation, the equivalent of bare fiberglass.

An example calculation is set forth: To 100 ml of phenolic resin and 30 ml of water, 0.26 grams of AgNO$_3$ powder were added. This resulted in a 0.002 gram AgNo$_3$/ml of solution for a 0.20% concentration (grams AgNo$_3$/100 ml). A 0.44 ft$^2$ piece of media (8 inc.×8 inc.) was sprayed with three squirts (1.5 ml per squirt) from a squirt bottle. (3×1.5 ml=4.5 ml×0.002 grams AgNO$_3$/ml=0.01 grams AgNO$_3$/0.44 ft$^2$ of media=0.02 grams AgNO$_3$/ft$^2$).

TABLE 1

Antimicrobial Agent Applications

| | Dilute Solution % Concentration | Quantity Applied g/ft$^2$ | Curing Condition Temp., F. - Time, mins. |
|---|---|---|---|
| Comp. Prod. A | 0.93 | 0.07 | 212 - 15 |
| Comp. Prod. B | 20.0 | 1.27 | 212 - 15 |
| Comp. Prod. C | 2.32 | 0.17 | 250 - 15 |
| Comp. Prod. D | 23.5 | 1.79 | 250 - 15 |
| Comp. Prod. E | 20.0 | 1.52 | 212 - 15 |
| Comp. Prod. F | 3.65 | 0.27 | 212 - 15 |
| Comp. Prod. G | 13.3 | 1.01 | 212 - 15 |
| Comp. Prod. H | 2.00 | 0.15 | 212 - 15 |
| Comp. Prod. I | 1.00 | 0.02 | 250 - 15 |
| Comp. Prod. J | 1.14 | 0.80 | 212 - 15 |
| Silver Plating | 2.86 | 1.40 | 212 - 15 |
| Copper II Nitrate | 0.28 | 0.02 | 212 - 15 |
| Silver Nitrate | 0.20 | 0.02 | 212 - 15 |
| Silver Chloride | 0.32 | 0.02 | 212 - 15 |

This experiment provided the application parameters for all tested agents. Subsequent experiments referencing one of the above antimicrobial agents utilize the above concentrations, quantity applied and curing condition.

EXAMPLE 2

Stripping Of Organic Biocides

This experiment was conducted to determine the effect of different temperature/humidity controlled air conditions on the stripping off of various organic antimicrobial agents. Stripping was determined by variations in the total organic carbon (TOC) in the antimicrobial/fiberglass air filtration media samples.

Figure 3:
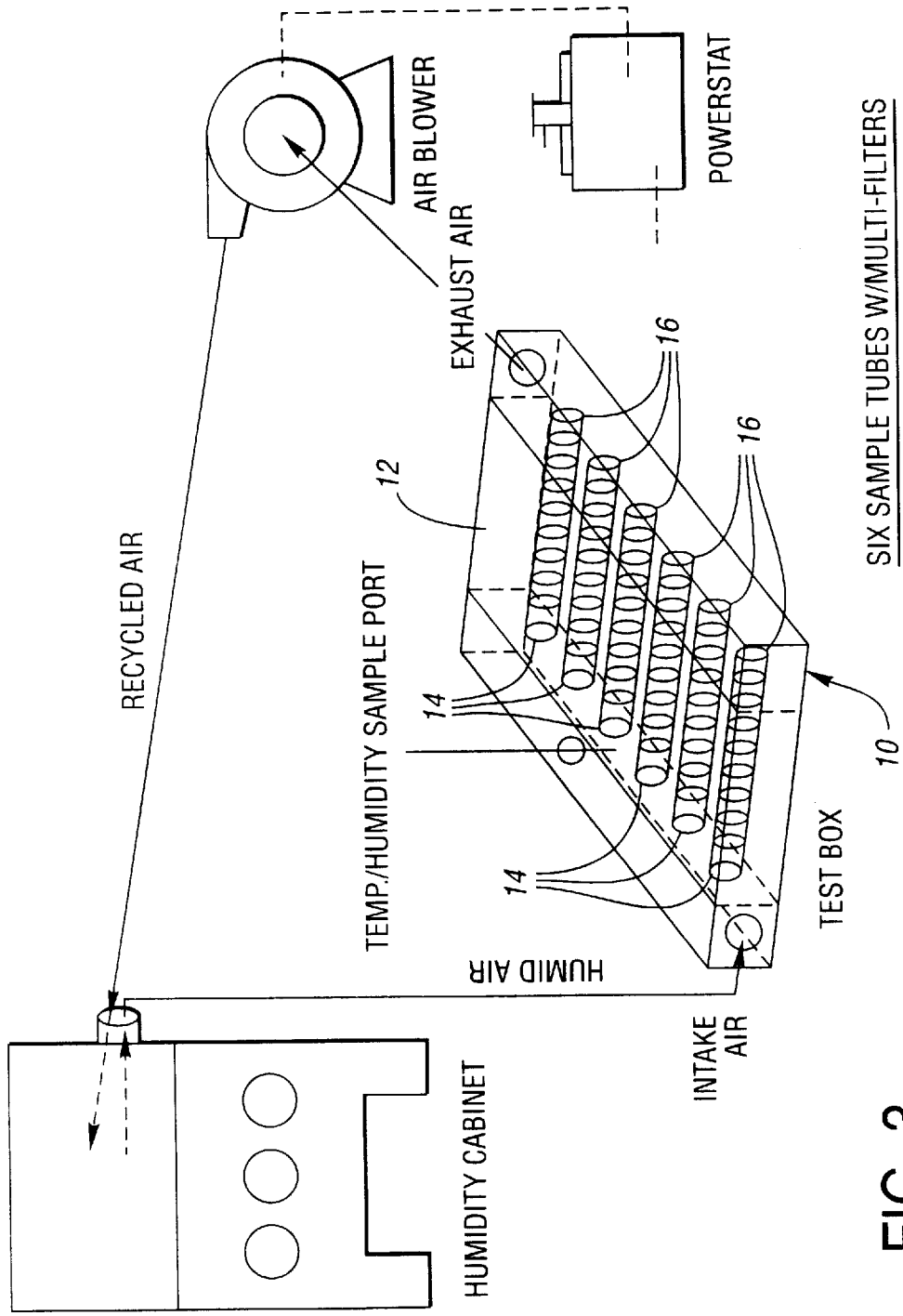
FIG. 3 is an illustration of the temperature/humidity test apparatus.

The test apparatus is illustrated in FIG. 3. The sample test box 10 was insulated on the outside 12 in order to avoid water condensation. Samples 14 were prepared by cutting burned out AFS-3 with a two ⅜ inch round steel die. The sample media pieces were sprayed with five of the organic antimicrobial agent solutions of example 1. The resulting samples fit snugly inside the two ⅜ inch inside diameter test tube. Five of the six sample tubes 16 were loaded with multiple pieces of mat sprayed with the same agent. The sixth sample tube 16' had a set of "control" mats without an agent. A total of five different antimicrobials, along with a control were tested with one sample being taken off from every tube 16 and 16'. Humid air velocity was held constant at 40 cfm. Initial test results were inconclusive. This is believed to be due to the fact that water was used as the diluent for the TOC determination, and the mats tested were originally sprayed with standard phenolic resin. Although this experiment was not highly successful at quantitative measurement stripping of organic biocides, it did show that stripping was a problem.

However, stripping was observed under the conditions that would generally be the most severe that air filtration media would normally experience in the real world. The data in Table 2 indicates that at conditions of 80° F. and 90% R. H., the organic antimicrobial agents are stripped from the sprayed media. Although the test method lacked the ability to quantitatively detect the antimicrobial agent, it can be seen that the TOC's stripped were greater than the background count shown for the control sample. This indicates that the antimicrobial agents were adding TOC's to the background levels. Only two weeks in these conditions would render these organic antimicrobial air filters ineffective. Table 3 shows that at conditions 74° F. of and 70% RH there are some stripping losses after five weeks.

TABLE 2

Stripping Off of Organic Antimicrobials at 80° F. & 90% R.H.

| | Quantity Applied g/ft$^2$ | Detected TOC Conc. ppm Time, Weeks | | |
|---|---|---|---|---|
| | | 0 | 1 | 2 |
| Control (AFS-3) (Background) | 0.80 (Binder) | 47 | 66 | 58 |
| Comp. Prod. A | 0.07 | 142 | 52 | 33 |
| Comp. Prod. B | 1.27 | 70 | 87 | 34 |
| Comp. Prod. D | 1.79 | 74 | 87 | 41 |
| Comp. Prod. E | 1.52 | 951 | 2434? | 67 |

TABLE 3

Stripping Off of Organic Antimicrobials
at 74° F. & 70% R.H.

|  | Quantity Applied | Detected TOC Conc. ppm Time, Weeks | | | | | | |
|---|---|---|---|---|---|---|---|---|
|  | g/ft² | 0 | 1 | 2 | 3 | 4 | 5 | 6 |
| Control (AFS-3) (Background) | 0.80 (Binder) | 68 | 47 | 87 | 74 | 51 | 58 | 40 |
| Comp. Prod. A | 0.07 | 42 | 77 | 44 | 47 | 58 | 33 | 33 |
| Comp. Prod. B | 1.27 | 59 | 38 | 67 | 70 | 46 | 49 | 36 |
| Comp. Prod. D | 1.79 | 53 | 55 | 64 | 87 | 55 | 62 | 43 |
| Comp. Prod. D | 1.01 | 102 | 103 | 110 | 261 | 124 | 98 | 52 |
| Comp. Prod. J | 0.27 | 55 | 67 | 82 | 112 | 64 | 61 | 39 |

The results of this test indicate the extent of probable air stripping of organic antimicrobial agents.

EXAMPLE 3
Analysis Of Microorganisms

Due to its distinct red color, Serratia marcescens was chosen as a test bacteria. This is an easily traceable, mobile bacteria rod species. The initial specimens were ATCC 8100 (American Type Culture Collection, 12301 Parklawn Drive, Rockville, Md. 20852) from a Bactrol Disk. Cultures of the bacteria were grown so that the air filter media could be challenged.

Figure 4:
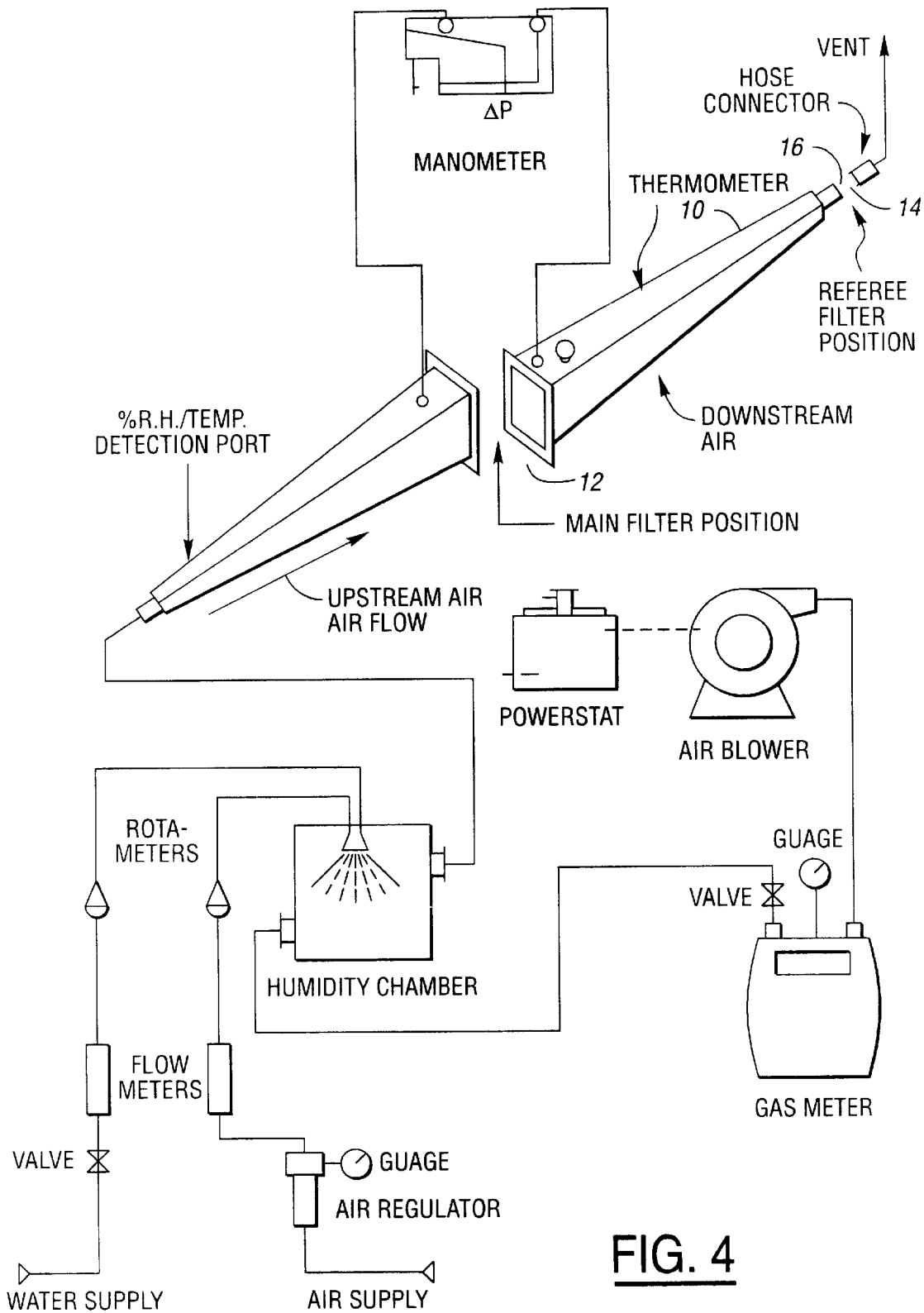
FIG. 4 is an illustration of the test duct tunnel apparatus.

Using a nebulizer, untreated air filtration media (AFS-3, fiberglass with cured phenolic binder) was sprayed with a quantitative centrifuged cell mixture of Serratia marcescens (approximately 45 EE08 cells/ml) and AC Dust in the test duct apparatus illustrated in FIG. 4. The exiting air was monitored at the end of the air tunnel 10 at various time intervals in order to determine how many organisms would typically pass through the main filter 12. Using a 0.2 um referee filter 14 at the exit 16 of the tunnel 10, downstream organisms were trapped by passing through the referee filter 14 over time. Plate counts were done on the referee filters by transferring them directly to an agar plate and incubating for 24–48 hours at 28°–32° C. In order to simulate ASHRAE's air flow tunnel conditions for filtration media testing, the test duct apparatus was run at approximately 40 cfm. A relative humidity of 50–60% and a temperature of 65°–70° F. were maintained.

Initial bacterial plate counts revealed the complete elimination of organism passage. However, after five weeks of continual testing at 40 cfm and supplying the bacteria with a food source, organisms multiplied and were able to pass through the media into downstream air. Thus while the "control" was initially an effective filter, little more than one month's use resulted in failure.

In order to determine the antimicrobial effectiveness of the various inorganic antimicrobials as applied to the above "controls", a zone-of-inhibition test was undertaken. This test used the disk-plate technique that observes the zone of inhibition (a clear area) around the disk. The disk was comprised of the air filtration media (fiberglass+phenolic binder) with an effective amount of an inorganic antimicrobial agent. A small piece of media (¼"×¼") treated with antimicrobial agent was placed upon the surface and in the middle of an inoculated plate of organisms. After incubation of 48 hours at 32° C., the plate was observed for any zone of inhibition surrounding the air filtration media. A zone of inhibition around the media indicated that the organism was inhibited by the particular inorganic antimicrobial agent, which diffused into the agar from the mat. Tables 4 and 5 indicate the results of inhibitions studies with Serratia marcescens and "typical" organisms from a dirty air filter.

TABLE 4

Zones of Inhibition with *Serratia marcescens*

| Agar Plate w/ Antimicrobial Mat | Zone of Inhibition? Yes or No | Diameter, inches |
|---|---|---|
| Control Plate (No Mat) | No (as expected) | 0 |
| Control Mat (No Agent) | No | 0 |
| Competitive Prod. B | No | 0 |
| Silver Nitrate | Yes | 2 |
| Competitive Prod. A | Yes | 1.5 |
| Competitive Prod. G | Yes | 1 |
| Copper II Nitrate | Yes | 0.5 |
| Silver Chloride | Yes | 0.75 |
| Silver Plating | Yes | 0.75 |
| Reemay ® Scrim (#2004) | Yes | 0 |
| Reemay ® Scrim (#2200) | Yes | 0 |

TABLE 5

Zones of Inhibition with "Typical" Dirty Filter Organisms

| Agar Plate w/ Antimicrobial Mat | Zone of Inhibition? Yes or No | Diameter, inches |
|---|---|---|
| Control Plate (No Mat) | No (as expected) | 0 |
| Control Mat (No Agent) | No | 0 |
| Competitive Prod. B | Yes | 0.5 |
| Silver Nitrate | Yes | 2.25 |
| Competitive Prod. A | Yes | 2.0 |
| Competitive Prod. G | Yes | 1.25 |
| Copper II Nitrate | Yes | 0.75 |
| Silver Chloride | Yes | 0.75 |
| Silver Plating | Yes | 0.75 |
| Reemay ® Scrim (#2004) | Yes | 1 |
| Reemay ® Scrim (#2200) | Yes | 1 |

The results indicate that the inorganic antimicrobials are as good as and in some cases better antimicrobial agents than the competitive product organic agents.

EXAMPLE 4
Air Flow Tunnel Evaluation Study

Figure 5:
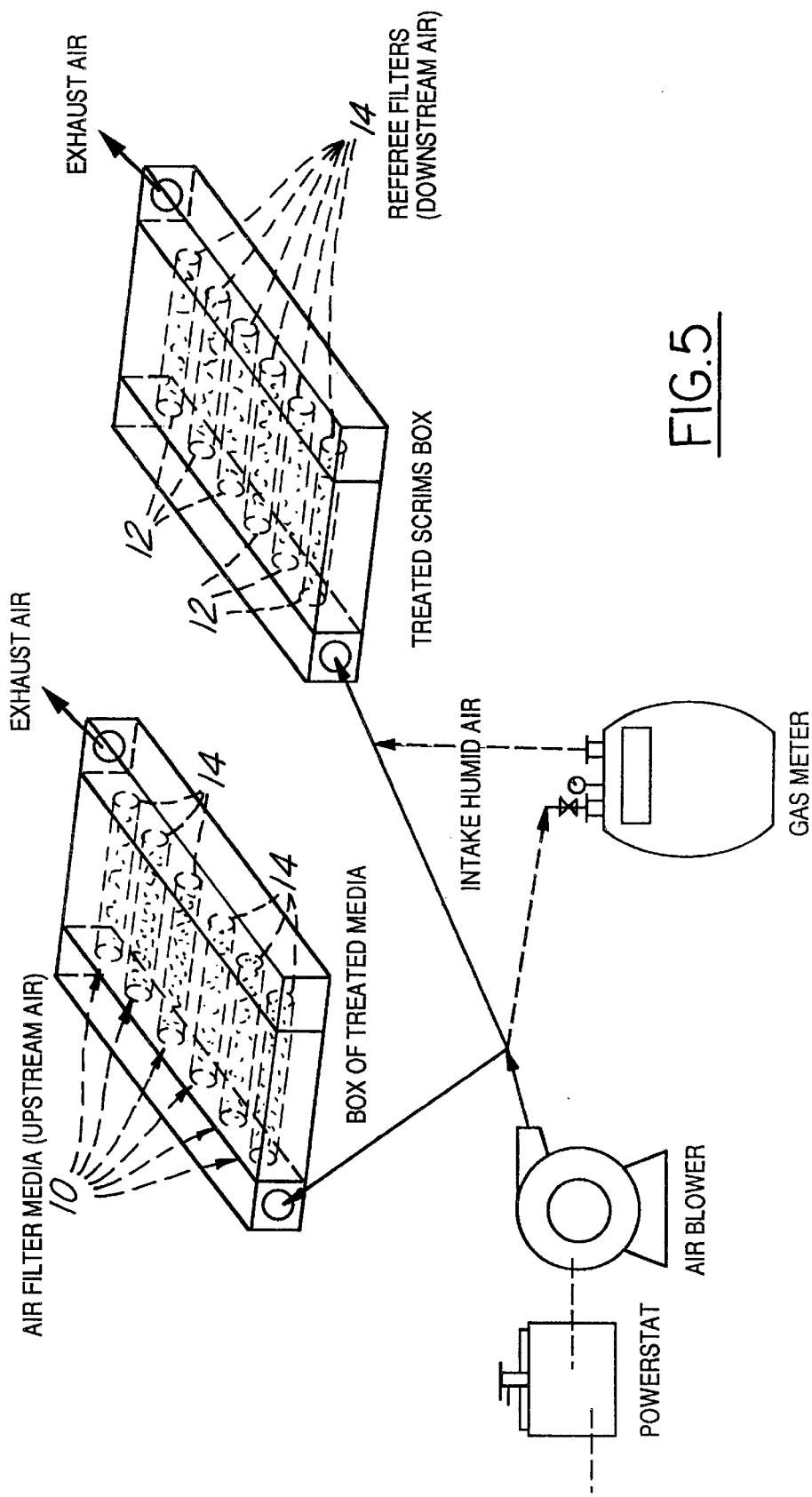
FIG. 5 is an illustration of the air flow multi-tube test apparatus.

The best candidates from Example 3 were evaluated in the multi-tube test apparatus illustrated in FIG. 5. The inorganic antimicrobial agents were applied to the air filter media or on scrims. Each sample was loaded into a separate tube, with the treated media samples 10 and the treated scrim samples 12 in separate boxes.

After 13 weeks of running the test with an air velocity of 11.1 feet/minute, no organisms were found to have passed through any of the filter media. The room's air was tested and indicated a heavy growth of both black granular yeast and grey flat mold. In an attempt to increase the severity of the test, the unit was run without the referee filters 14 in place. This increased the air flow to approximately 40 feet/minute. No organisms were found to have passed through until the air velocity was again increased to 127.8 feet per minute. The test was challenged even further by addition of two 5 ml doses of organisms broth/sucrose solutions of approximately 65 EE9 organisms per ml each were sprayed prior to the emergence of any organisms. See results in Tables 6 and 7. The sprayed organism challenges consisted of filamentous molds with some Serratia marcesens. Tables 6, 7 and the results of Example 2 indicate that the best antimicrobial agents were the silver nitrate, copper II nitrate and competitive product A.

TABLE 6

Organisms Counts On Agar Plates
For Different Antimicrobial Agents
Mold counts on agar plates of week 17 of test - 24 hours of collection, after 72 hours of high air velocity air through the treated filters.

| Agent Name | Referee Filters | Total # of Swabbed tube walls | Molds on Downstream |
|---|---|---|---|
| Treated Scrims | | | |
| Comp. Prod. G | 0 | 6 | 6 |
| Comp. Prod. B | 1 | 0 | 1 |
| Reemay ® | 0 | 4 | 4 |
| Comp. Prod. A | 0 | 0 | 0 |
| Silver nitrate | 0 | 0 | 0 |
| Copper II nitrate | 1 | 5 | 6 |
| Treated Media | | | |
| Comp. Prod. B | 1 | 1 | 2 |
| Control | 1 | 1 | 1 |
| Comp. Prod. A | 1 | 0 | 1 |
| Silver nitrate | 1 | 0 | 1 |
| Copper II nitrate | 0 | 1 | 1 |

TABLE 7

Organisms Counts On Agar Plates
For Different Antimicrobials
Mold counts on agar plates of week 18 of test - 1 week of collection with referee filters in place (referee filters mounted immediately upon removal of above filters) with an average air velocity of 13.9 cfm/ft$^2$.

| Agent, Name | Referee Filters Treated Scrims # of Molds | Referee Filters Treated Media # of Molds |
|---|---|---|
| Comp. Prod. G | 1 | 1 |
| Comp. Prod. B | 1 | 2 (also 1 s. marces. colony) |
| Reemay ® | 2 | — |
| Control | — | 3 |
| Comp. Prod. A | 1 | 1 |
| Silver nitrate | 1 | 1 |
| Copper nitrate | 3 | 1 |

A new test was conducted in which silver nitrate and copper II nitrate were evaluated at three different levels of concentration on treated media [fiberglass & binder] and treated scrim. The results are indicated in Tables 8 and 9. This test was conducted in the standard conditioning room illustrated in FIG. 5. There was a constant air velocity of 40 feet per minute and a total of five weekly challenges of organisms broth/sucrose solutions containing 65 EE9 organisms/ml each [5 ml/week]. Microorganism penetration in the downstream air began after the sixth week of the test. Interpretative data began on the seventh week of the test.

TABLE 8

Organisms Counts On Agar Plates
For Inorganic Antimicrobial Agents
Mold counts on agar plates of week 7 of test - 24 hours of collection, after continual high air velocity air flow through the treated filters.

| Agent Name, | % Concentration | Referee Filters | Swabbed tubed walls | Total # of Molds on Downstream |
|---|---|---|---|---|
| Treated Scrims | | | | |
| Silver nitrate, | 0.2% | 0 | 0 | 0 |
| | 0.1% | 1 | 0 | 1 |
| | 0.05% | 1 | 1 | 2 |
| Copper II nitrate | 0.28% | 0 | 0 | 0 |
| | 0.14% | 0 | 0 | 0 |
| | 0.07% | 5 | 1 | 6 |
| Treated Media | | | | |
| Silver nitrate, | 0.2% | — | 1 | — |
| | 0.1% | 3 | 0 | 3 |
| | 0.05% | 3 | 1 | 4 |

TABLE 8-continued

Organisms Counts On Agar Plates
For Inorganic Antimicrobial Agents
Mold counts on agar plates of week 7 of test - 24 hours
of collection, after continual high air velocity air
flow through the treated filters.

| Agent Name, | % Concentration | Referee Filters | Swabbed tubed walls | Total # of Molds on Downstream |
| --- | --- | --- | --- | --- |
| Copper II nitrate | 0.28% | 3 | 0 | 3 |
|  | 0.14% | 0 | 0 | 0 |
| Control (No Biocide) |  | 3 | 2 | 5 |

TABLE 9

Organisms Counts On Agar Plates
For Inorganic Antimicrobial Agents
Mold counts on agar plates of week 9 of test - 24 hours
of collection, after continual high air velocity air
flow through the treated filters.

| Agent Name, | % Concentration | Referee Filters | Swabbed tubed walls | Total # of Molds on Downstream |
| --- | --- | --- | --- | --- |
| Treated Scrims |  |  |  |  |
| Silver nitrate, | 0.2% | 0 | 0 | 0 |
|  | 0.1% | 0 | 1 | 1 |
|  | 0.05% | 0 | 0 | 0 |
| Copper II nitrate | 0.28% | 0 | 1 | 1 |
|  | 0.14% | 0 | 0 | 0 |
|  | 0.07% | 1 | 2 | 3 |
| Treated Media |  |  |  |  |
| Silver nitrate, | 0.2% | 3 | 0 | 3 |
|  | 0.1% | 3 | 4 | 7 |
|  | 0.05% | 2 | 1 | 3 |
| Copper II nitrate | 0.28% | 2 | 0 | 2 |
|  | 0.14% | 1 | 0 | 1 |
| Control (No Biocide) |  | 2 | 0 | 2 |

The results indicate that both silver nitrate and copper II nitrate at concentrations as low as 0.1% offer efficient antimicrobial protection, without the danger of further contamination as a result of stripping.

While the best modes for carrying out the invention have been described in detail, those familiar with the art to which the invention relates will recognize various alternative designs and embodiments for practicing the invention as defined by the following claims.

What is claimed is:

1. A method of making an air filter media which reduces the amount of microorganisms in contaminated air, comprising the steps of:
   providing an air porous fiberglass mat;
   placing on the fiberglass an antimicrobially effective amount of an inorganic antimicrobial agent so as to be positioned in the path of contaminated air passed through the fiberglass mat to thereby reduce the amount of microorganisms in the contaminated air;
   wherein the step of placing the inorganic antimicrobial agent on the fiberglass further comprises the steps of:
      mixing an aqueous solution of a water-soluble inorganic antimicrobial agent with a fiberglass binder resin solution to form an aqueous antimicrobial agent-containing binder solution; and
      spraying said aqueous antimicrobial agent-containing binder solution onto the fiberglass.

2. The method of claim 1 wherein the inorganic antimicrobial is a compound comprised of an element selected from the group consisting of silver, copper, gold, and zinc.

3. A method of making an air filter media which reduces the amount of microorganisms in contaminated air, comprising the steps of:
   providing a rigid, air porous fiberglass media;
   providing at least one scrim;
   placing on the scrim an antimicrobially effective amount of an inorganic antimicrobial agent so as to be positioned in the path of contaminated air passed through the scrim;
   placing the scrim such that a surface of the scrim is contiguous with the air porous fiberglass mat whereby contaminated air entering or leaving the air porous fiberglass passes through the scrim;
   wherein the step of placing the inorganic antimicrobial agent on the scrim further comprises the steps of:
      mixing an aqueous solution of a water-soluble inorganic antimicrobial agent with a fiberglass binder resin solution to form an aqueous antimicrobial agent-containing binder solution; and
      spraying said aqueous antimicrobial agent-containing binder solution onto the scrim.

4. The method of claim 3 wherein the inorganic antimicrobial agent is a compound comprised of an element selected from the group consisting of silver, copper, gold, and zinc.

5. A method of making an air filter media which reduces the amount of microorganisms in contaminated air, comprising the steps of:

provide an air porous fiberglass mat;

placing onto fiberglass contained in said air porous fiberglass mat, a fiberglass binder solution having added thereto an antimicrobially effective amount of one or more water soluble inorganic salts of metal(s) selected from the group consisting of silver, gold, copper, and zinc; and recovering an air porous, inorganic salt-containing binder coated, fiberglass mat product.

6. The method of claim 5 wherein said fiberglass binder comprises a phenolic, acrylic, or melamine resin binder.

7. The method of claim 6 wherein at least one said inorganic salts is a salt containing Ag(I) or Cu(II).

8. The method of claim 7 wherein said salt containing Ag(I) or Cu(II) is selected from the group consisting of silver (I) nitrate, silver (I) sulfate, copper (II) nitrate, and copper (II) sulfate.

9. A method for preparing an air filter media which reduces the amount of microorganisms in contaminated air, comprising:

commingling fiberized glass and an aerosol containing a water soluble resin binder having added thereto an antimicrobially effective amount of one or more water soluble inorganic salts of metal(s) selected from the group consisting of silver, gold, copper, and zinc, to form inorganic salt-containing resin binder-coated glass fibers; and collecting said inorganic salt-containing resin binder-coated glass fibers to form an air porous glass fiber mat.

10. The method of claim 9 wherein said water soluble resin binder comprises a phenolic resin, an acrylic resin, or a melamine resin.

11. The method of claim 10 wherein at least one of said inorganic salts is a salt containing Ag(I) or Cu(II).

12. The method of claim 11 wherein said salt containing Ag(I) or Cu(II) is selected from the group consisting of silver (I) nitrate, silver (I) sulfate, copper (II) nitrate, and copper (II) sulfate.

* * * * *